E. A. HAWTHORNE.
SWITCH.
APPLICATION FILED JULY 31, 1913.

1,205,624.

Patented Nov. 21, 1916.

Witnesses:
Horace A. Crossman
Carl L. Choate.

Inventor:
Ellsworth A. Hawthorne.
by Emery Booth, Janney Varney
Attys

UNITED STATES PATENT OFFICE.

ELLSWORTH A. HAWTHORNE, OF BRIDGEPORT, CONNECTICUT.

SWITCH.

1,205,624.   Specification of Letters Patent.   Patented Nov. 21, 1916.

Application filed July 31, 1913. Serial No. 782,215.

*To all whom it may concern:*

Be it known that I, ELLSWORTH A. HAWTHORNE, a citizen of the United States, and a resident of Bridgeport, county of Fairfield, and State of Connecticut, have invented an Improvement in Switches, of which the following description, in connection with the accompanying drawings, is a specification, like characters on the drawings representing like parts.

This invention relates to electric switches, and more especially, though not exclusively, to a combined battery with its casing and switch, forming a unitary structure for the housing and control of the current supply for electric lamps of a vehicle, such for example as a motor cycle.

My invention will be best understood by reference to the following specification, when taken in connection with the accompanying drawings of one specific embodiment thereof, while its scope will be more particularly pointed out in the appended claims.

Figure 1:
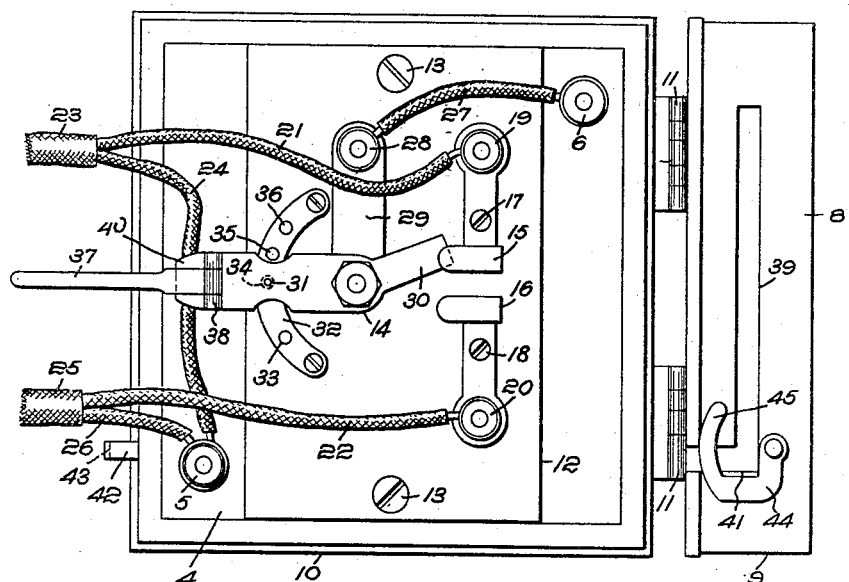
Figure 2:
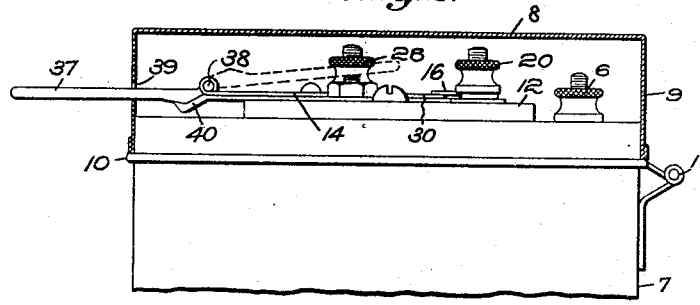
Figure 3:
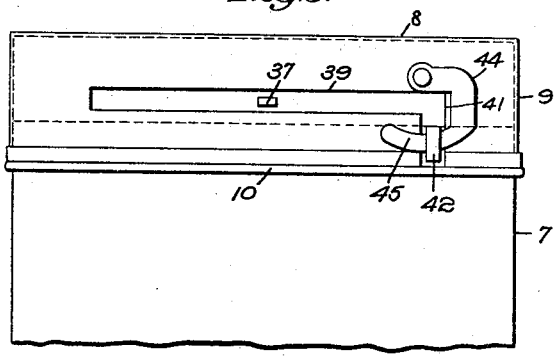

In the drawings: Figure 1 is a plan of a combined battery, battery casing and switch embodying my invention, the cover of the battery casing being shown open; Fig. 2 is a side elevation of the same with the cover shown in vertical section; and Fig. 3 is a front elevation of the same with the cover closed and fastened.

Referring to the drawings, and to the embodiment of my invention which I have selected for illustration, I have there shown a battery 4, which may be of any appropriate type, such for example as a storage battery, and is provided with terminals 5 and 6. The battery is herein mounted in a casing 7, having an opening in its top fitted with a cover 8 provided with a depending flange 9, resting upon a shoulder 10 projecting laterally from the body of the casing. The cover may be applied to the body of the casing in any other appropriate manner, but herein is hinged at 11.

Superposed upon the battery is a switch mounting 12, preferably in the form of a plate of insulating material secured in place by a plurality of screws 13. This mounting supports a switch, herein comprising a pivoted switch member 14 and a pair of stationary contacts 15 and 16. The latter are herein secured to the mounting 12 by screws 17 and 18, respectively, and are provided with binding posts 19 and 20, which may be connected by wires 21 and 22 to the lamps or other devices which are to be controlled. The wire 21 forms one of the wires of a cable 23 having another wire 24 connected to the terminal 5 of the battery, while in like manner the wire 22 forms one of the wires of a cable 25, having another wire 26 also connected to said terminal. The other terminal 6 of the battery is herein connected by a wire 27 to a binding post 28 connected by a conductor 29 to the pivoted switch member 14. The latter is provided with a contact arm 30, which in one position contacts with the member 15, in a second position contacts with the members 15 and 16, in a third position contacts with the member 16 alone, and in a fourth position contacts with neither. By this means, the switch may be utilized to connect either the cable 23 or the cable 25, or both, in circuit with the battery, or disconnect them altogether. It will be understood that where the switch is to be used in connection with an electric lighting apparatus of a motor cycle or other vehicle, one of the cables is intended to be connected to the terminals of the headlight, and the other to the terminals of the taillight.

As a means for holding the pivoted switch member in either of its four positions, it is herein provided with a depending rounded projection 31 engaging the top of a segmental plate 32, the latter being provided with depressions 33, 34, 35 and 36, corresponding to the four positions of the switch. The switch arm 14 is made in the form of a flat spring, which is resilient vertically, so as to permit the same to yield and allow the rounded projection 31 to be forced out of one of the depressions, by simply applying sufficient force in a lateral direction.

As a means for making the switch accessible for operation while the cover is closed, while still permitting the switch-operating device to be rendered inaccessible when desired, the switch member 14 is herein provided with a switch handle 37 hinged at 38 on the switch member, and normally projecting through a slot 39 in the front flange of the cover. The pivoted switch handle may be supported in its extended position, as shown in Fig. 2, by means of a stop 40 limiting its downward swinging movement. The slot 39 may be of any other suitable character, but herein is parallel with the margin of the flange 9, and is provided with a main portion in which the switch handle is capable of playing to and fro during its normal operation. To facilitate the insertion of the switch handle in the slot, the latter is provided with an entrance 41, disposed transverse to the margin of the flange and entering at the bottom thereof, so that when the switch handle is unfolded, as shown in Figs. 1 and 2, and placed in the proper position with relation to the entrance of the slot, the cover may be closed and thus afford protection to the switch mechanism, while still permitting the same to be operated.

As a means for securing the cover in its closed position, the body of the casing is herein provided with a lug 42, projecting from its front wall and located in the entrance 41 of the slot when the cover is closed, as shown in Fig. 3. This lug is herein provided with a hole 43, to receive a hook 44, the latter being pivoted to the cover to swing in a plane parallel with the outer face of the flange, and having a curved portion 45, constituting a tongue passing through the hole 43. By this means, the cover is securely held in its closed position, and yet may be quickly and conveniently opened to allow the switch handle to be folded inwardly upon its supporting arm, after which the cover may be again closed and fastened.

While I have herein shown and described one form or embodiment of my invention for illustrative purposes, and have disclosed and discussed in detail the construction and arrangement incidental to one specific application thereof, it is to be understood that the invention is limited neither to the mere details or relative arrangement of parts, nor to the specific embodiment herein shown, but that extensive deviations from the illustrated form or embodiment of the invention may be made, without departing from the principles thereof.

Having thus described my invention, what I claim and desire by Letters Patent to procure is:—

1. An apparatus of the class described comprising, in combination, a casing having a cover provided with an opening, a switch in said casing, and a switch handle normally accessible through said opening but having provision whereby it may be placed within said casing and rendered inaccessible from the exterior thereof.

2. An apparatus of the class described comprising, in combination, a casing provided with an opening, a switch in said casing, a switch handle normally accessible through said opening for manual prehension, and having provision for rendering said handle inaccessible from the exterior of said casing.

3. An apparatus of the class described comprising, in combination, a casing having a cover provided with a lateral slot, a switch in said casing, and a hinged switch handle normally projecting through said slot but capable of being swung about its pivot to a position within said cover.

4. An apparatus of the class described comprising, in combination, a casing having a cover provided with a slot having an open end forming an entrance from the edge of said cover, a switch in said casing, and a hinged switch handle adapted to enter said slot through its open end and play to and fro in said slot during its normal operation of completing and interrupting a circuit.

5. An apparatus of the class described comprising, in combination, a casing having a cover provided with a slot having a main portion parallel with the margin of the cover and a part forming an entrance from the edge of and disposed transverse to the margin, a switch in said casing, and a switch handle movably connected to the switch and adapted to play to and fro in said main portion during its normal operation of completing and interrupting a circuit.

6. An apparatus of the class described comprising, in combination, a casing having a cover provided with a marginal flange hinged to the body of the casing and provided with a slot having a main portion substantially parallel with the margin of the flange and a portion forming an entrance and disposed transverse to the margin, a switch in said casing, a switch handle movably connected to the switch and adapted to play to and fro in said main portion during its normal operation, a lug on the body of the casing projecting through said entrance when the cover is closed, and means on said cover engaging said lug to hold said cover closed.

7. An apparatus of the class described comprising, in combination, a casing having a cover provided with a marginal flange hinged to the body of the casing and provided with a slot having a main portion substantially parallel with the margin of the flange and a portion forming an entrance and disposed transverse to the margin, a switch in said casing, a switch handle movably connected to the switch and adapted to play to and fro in said main portion during its normal operation, a lug on the body of the casing projecting through said entrance when the cover is closed, and provided with a hole, and a hook pivoted on said cover normally located in said hole to hold said cover closed.

8. An apparatus of the class described comprising, in combination, a casing having a cover provided with a marginal flange hinged to the body of the casing and provided with a slot having a main portion substantially parallel with the margin of the flange and a portion forming an entrance and disposed transverse to the margin, a switch in said casing, a switch handle movably connected to the switch and adapted to play to and fro in said main portion during its normal operation, a lug on the body of the casing projecting through said entrance when the cover is closed and provided with a hole, and a hook pivoted on said cover to swing in a plane parallel with the outer face of said flange and normally located in said hole to hold said cover closed.

In testimony whereof, I have signed my name to this specification, in the presence of two subscribing witnesses.

ELLSWORTH A. HAWTHORNE.

Witnesses:
  E. HORACE HAWTHORNE,
  E. LOUISE SCOTT.